US008832566B2

(12) United States Patent
Wakhlu

(10) Patent No.: US 8,832,566 B2
(45) Date of Patent: Sep. 9, 2014

(54) GRAPHICAL USER INTERFACE FOR SOCIAL AND PROFESSIONAL NETWORKING AND BUSINESS TRANSACTIONS

(76) Inventor: Anurag Wakhlu, Chelmsford, MA (US)

( * ) Notice: Subject to any disclaimer, the term of this patent is extended or adjusted under 35 U.S.C. 154(b) by 0 days.

(21) Appl. No.: 13/229,746

(22) Filed: Sep. 11, 2011

(65) Prior Publication Data

US 2012/0233557 A1 Sep. 13, 2012

Related U.S. Application Data

(60) Provisional application No. 61/381,982, filed on Sep. 11, 2010.

(51) Int. Cl.
*G06F 3/00* (2006.01)
*H04W 4/02* (2009.01)
*G06F 3/0481* (2013.01)
*G06Q 50/00* (2012.01)

(52) U.S. Cl.
CPC ............. *G06F 3/0481* (2013.01); *H04W 4/023* (2013.01); *G06Q 50/01* (2013.01)
USPC .......................................... 715/753; 715/864

(58) Field of Classification Search
CPC ..... G06Q 10/10; G06Q 10/109; G06Q 50/01; H04W 4/02; H04W 4/023; H04W 4/028; G06F 17/3087
USPC ....................................................... 715/753
See application file for complete search history.

(56) References Cited

U.S. PATENT DOCUMENTS

| | | | | |
|---|---|---|---|---|
| 8,565,810 | B1 * | 10/2013 | Giles et al. ................. | 455/550.1 |
| 2002/0054040 | A1 * | 5/2002 | Moshal et al. ............... | 345/440 |
| 2007/0147175 | A1 * | 6/2007 | Punkka .......................... | 368/21 |
| 2008/0252527 | A1 * | 10/2008 | Garcia .......................... | 342/450 |
| 2009/0169060 | A1 * | 7/2009 | Faenger et al. ............... | 382/113 |
| 2010/0058196 | A1 * | 3/2010 | Krishnan et al. ............. | 715/747 |
| 2010/0145947 | A1 * | 6/2010 | Kolman et al. ............... | 707/736 |
| 2010/0325214 | A1 * | 12/2010 | Gupta .......................... | 709/206 |
| 2011/0037712 | A1 * | 2/2011 | Kim et al. ..................... | 345/173 |
| 2011/0208814 | A1 * | 8/2011 | Bostrom et al. .............. | 709/204 |
| 2011/0314084 | A1 * | 12/2011 | Saretto et al. ................ | 709/203 |

OTHER PUBLICATIONS

"Locate your Friends with FriendsRadar for Android" published Dec. 6, 2010 on http://www.xda-developers.com/android/locate-your-friends-with-friendsradar-for-android.*
Friends Radar on the iTunes App Store, released Jul. 2, 2010. Retrieved from https://itunes.apple.com/us/app/friends-radar/id377695746?mt=8.*

* cited by examiner

*Primary Examiner* — Tuyetlien Tran
*Assistant Examiner* — Patrick Ramsey
(74) *Attorney, Agent, or Firm* — Indu M. Anand, Esq.; Law Offices of Indu M. Anand

(57) ABSTRACT

The present invention provides tools for efficient networking and is specially targeted to frequent travelers and others active in social networking. It enables users to squeeze in meet ups with their contacts when they happen to be or expect to be in the vicinity of those contacts. The invention envisions a system that allows users to declare where they are or will be, and invite their friends to join. The central feature of the system is a radar like graphical user interface and a flexible, private and customizable process under user control.

7 Claims, 16 Drawing Sheets

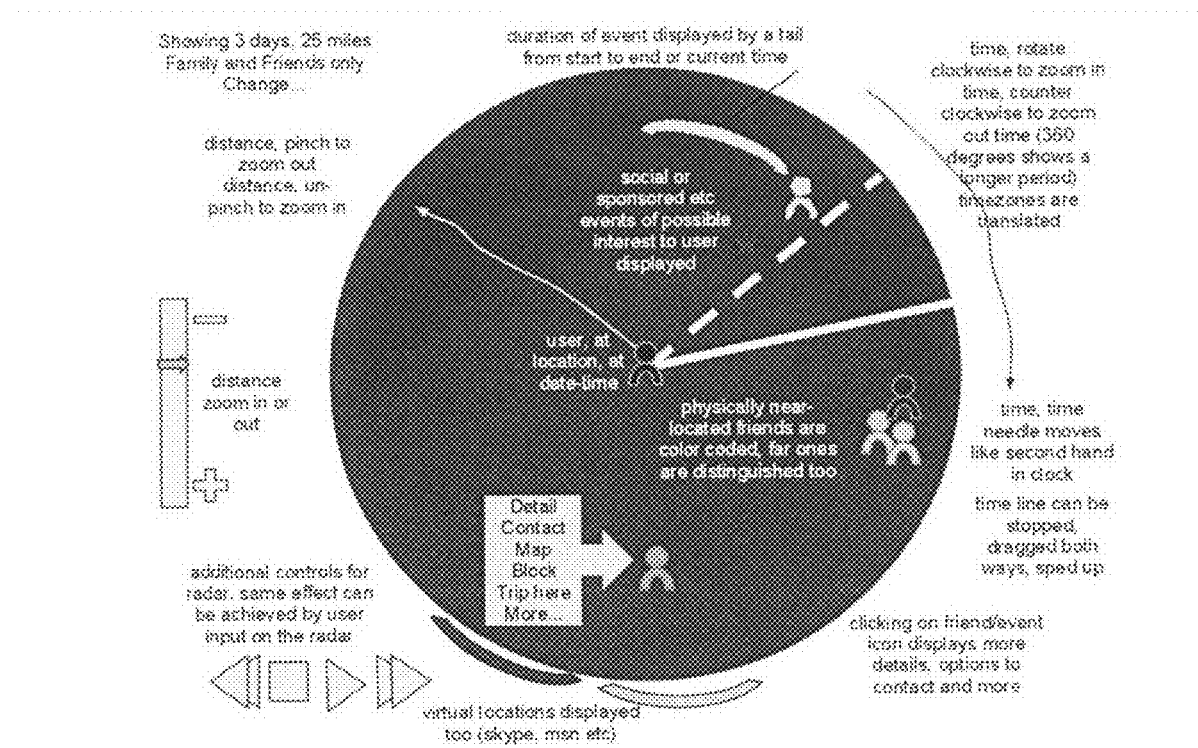
FIGURE 1. IMPLEMENTATION DETAILS OF THE RADAR INTERFACE

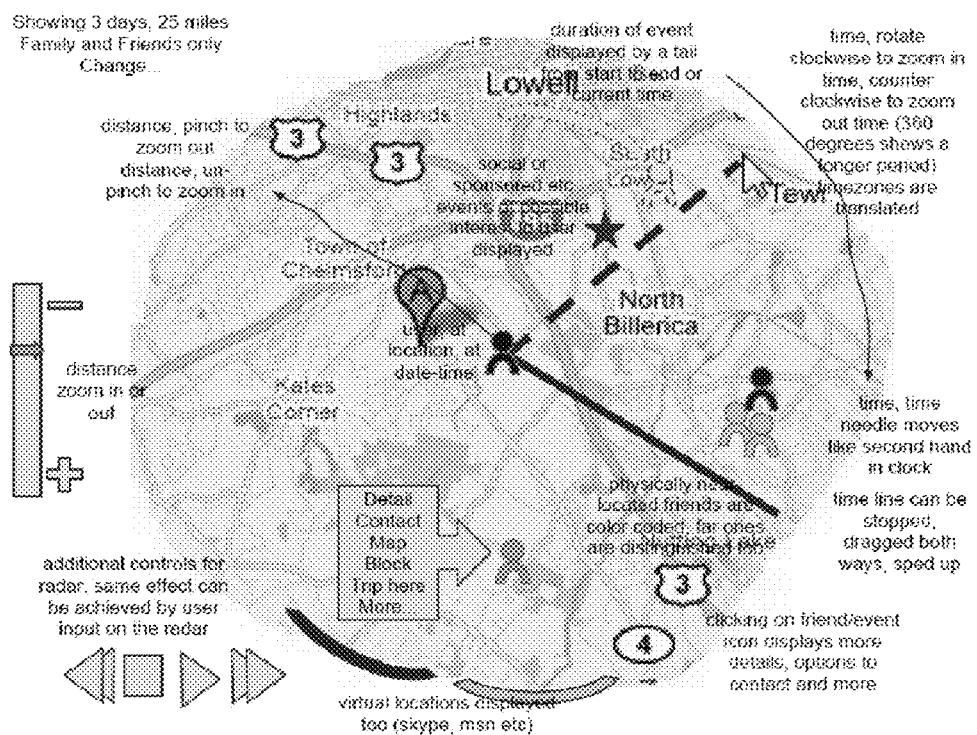
FIGURE 2. A SECOND VIEW OF THE RADAR INTERFACE

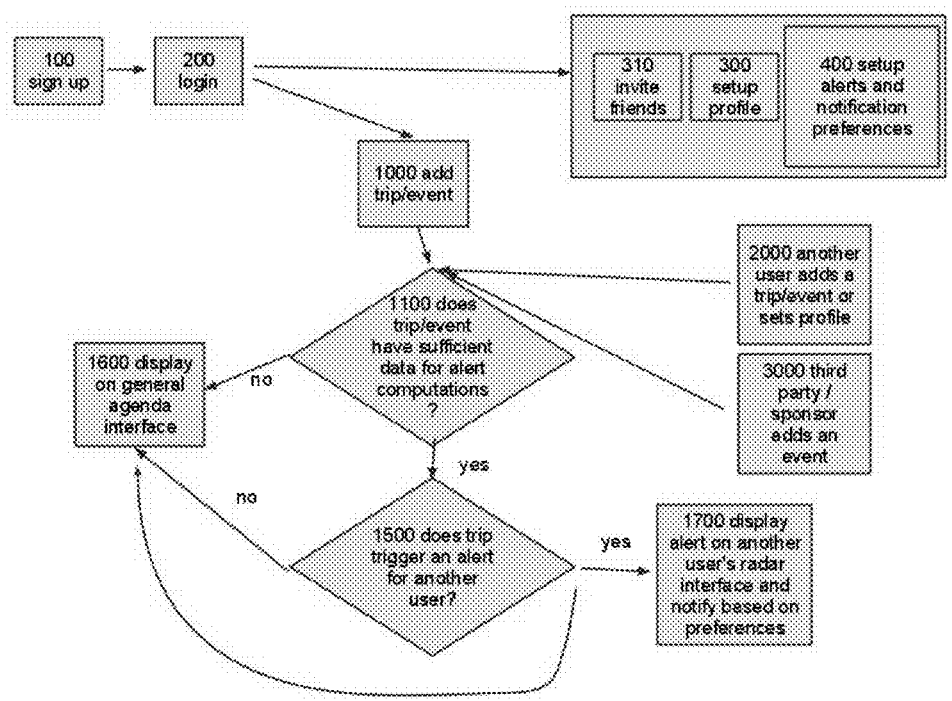
FIGURE 3. ONE ILLUSTRATIVE OVERVIEW OF THE LOGICAL FLOW OF SYSTEM

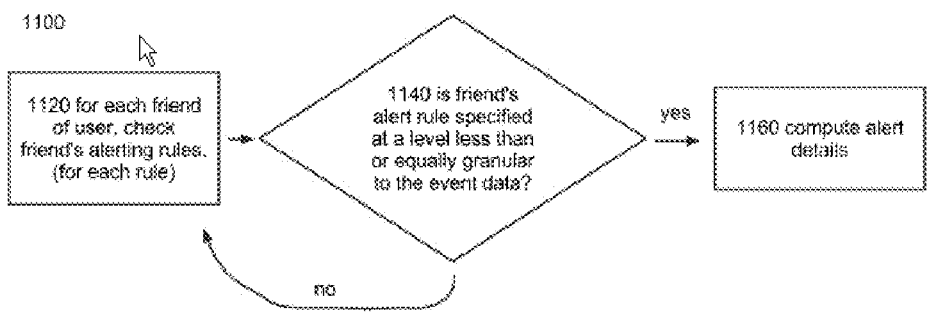
FIGURE 4. DETAILED VIEW OF BOX 1100 FROM FIGURE 3
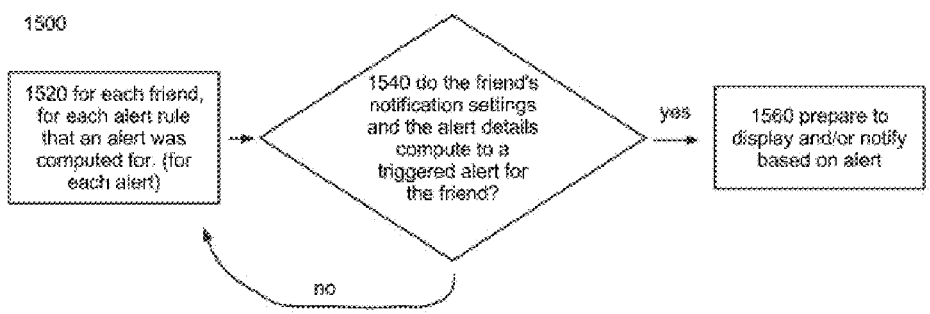
FIGURE 5. DETAILED VIEW OF BOX 1500 FROM FIGURE 3

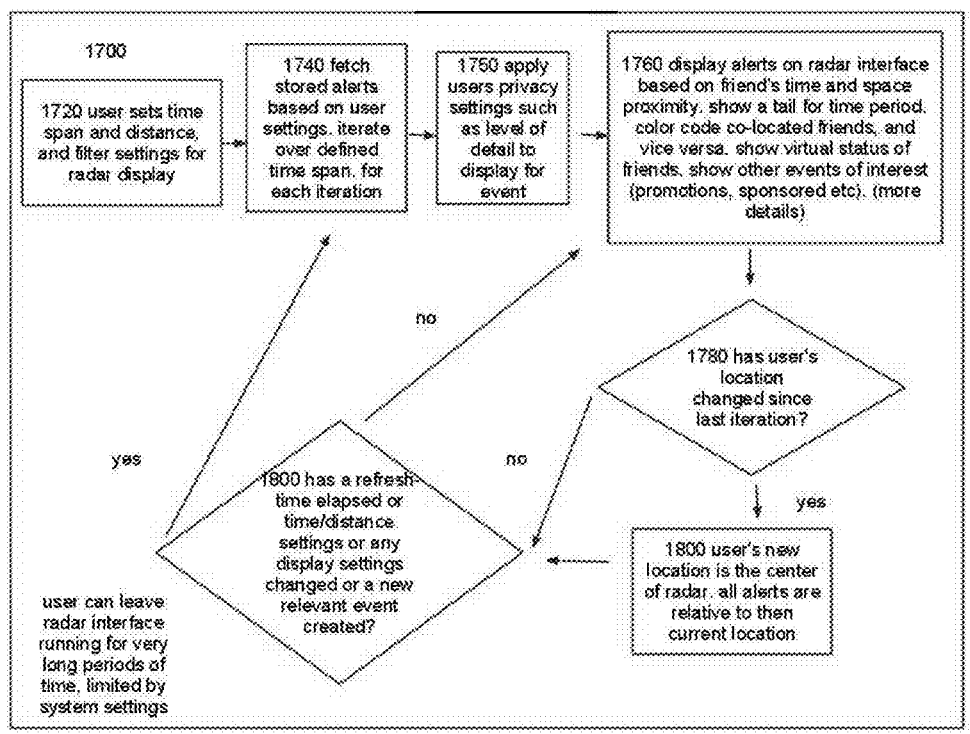
FIGURE 6. DETAILED VIEW OF BOX 1700 FROM FIGURE 3

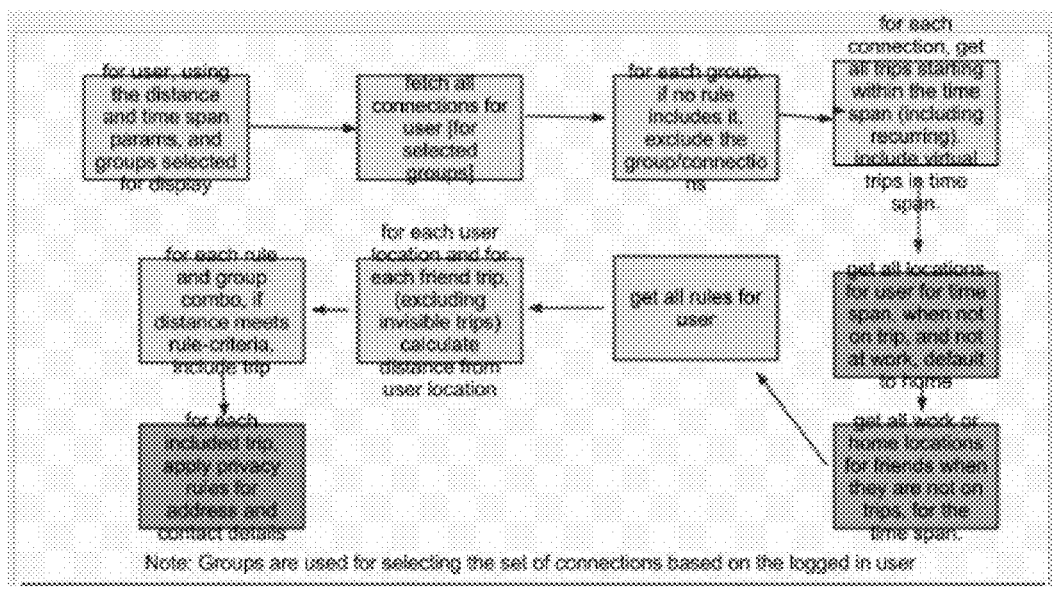
FIGURE 7. CORE LOGIC FOR FETCHING RADAR DATA
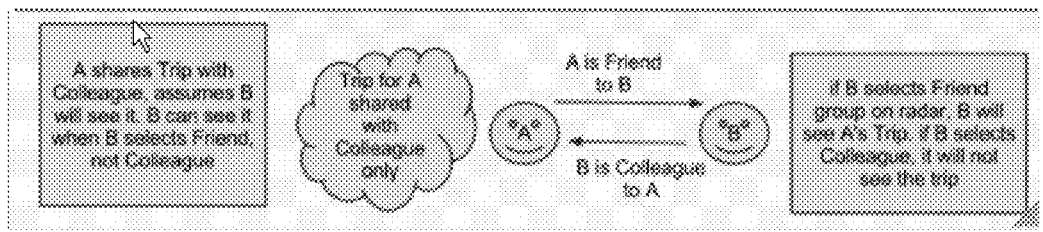
FIGURE 8. THE DUALITY OF THE GROUPS RELATIONSHIP

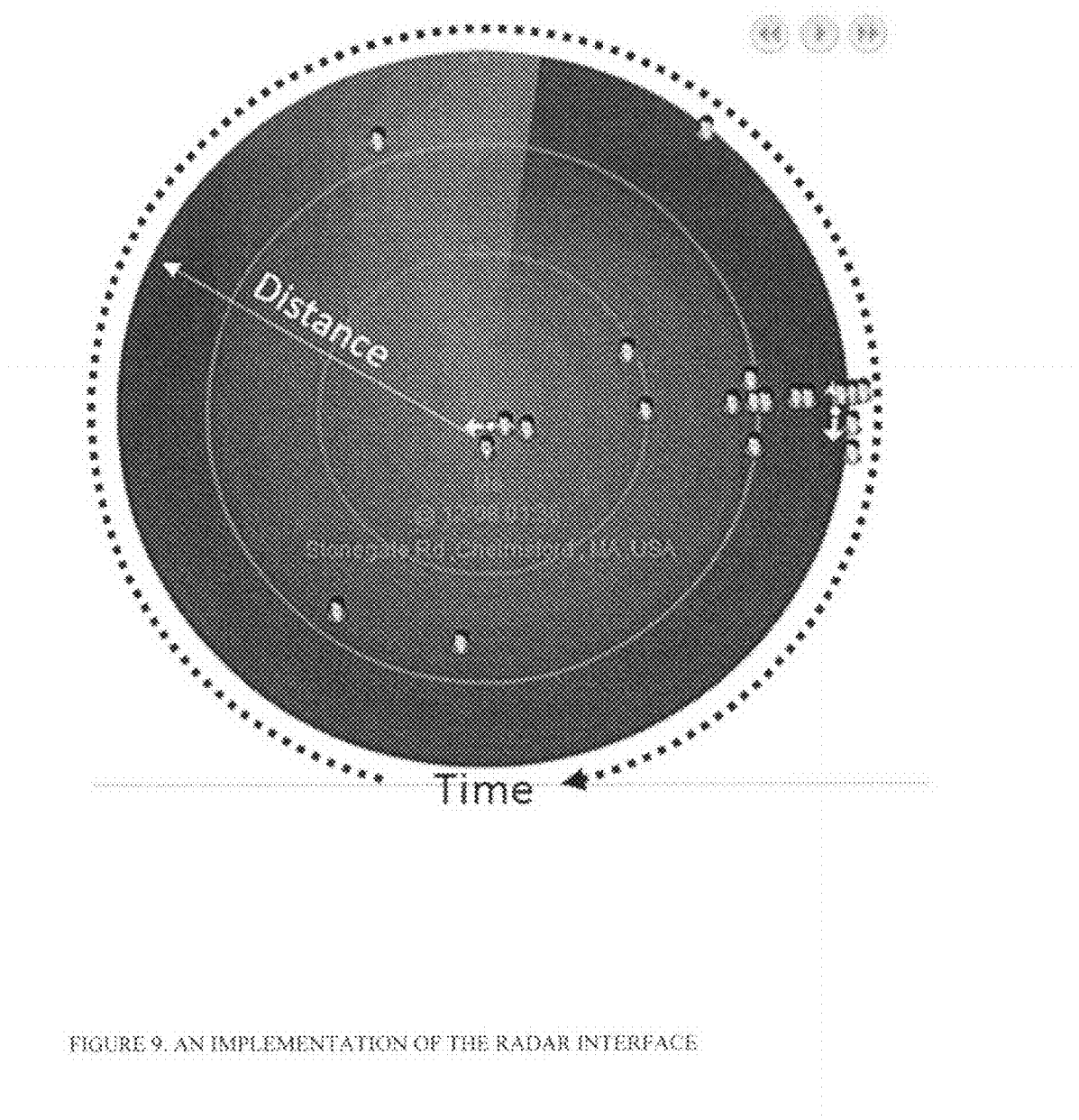
FIGURE 9. AN IMPLEMENTATION OF THE RADAR INTERFACE

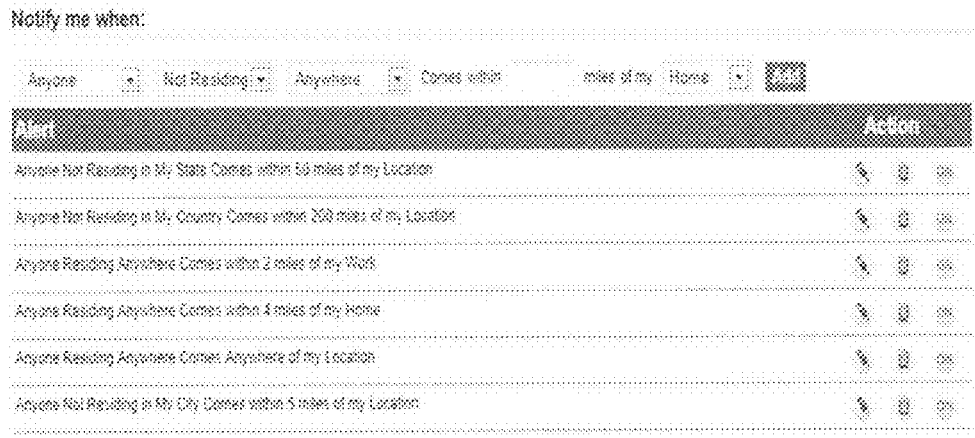
FIGURE 10. SCREEN TO SETUP CUSTOM RULES FOR USER'S PREFERENCES FOR THE RADAR INTERFACE

FIGURE 11. SCREEN TO ADD A NEW EVENT/TRIP/ACTIVITY INTO THE SYSTEM

FIGURE 12. SCREEN TO ENABLE THE USER TO SETUP CUSTOM GROUPS FOR PRIVACY CONTROL AND SELECTIVE SHARING.

FIGURE 13. SCREEN TO ENTER THE USER'S HOME AND WORK ADDRESSES AND ALLOW PRIVACY CONTROLS

FIGURE 14. SCREEN FOR MANAGING USER'S TRIPS/ACTIVITIES/EVENTS.

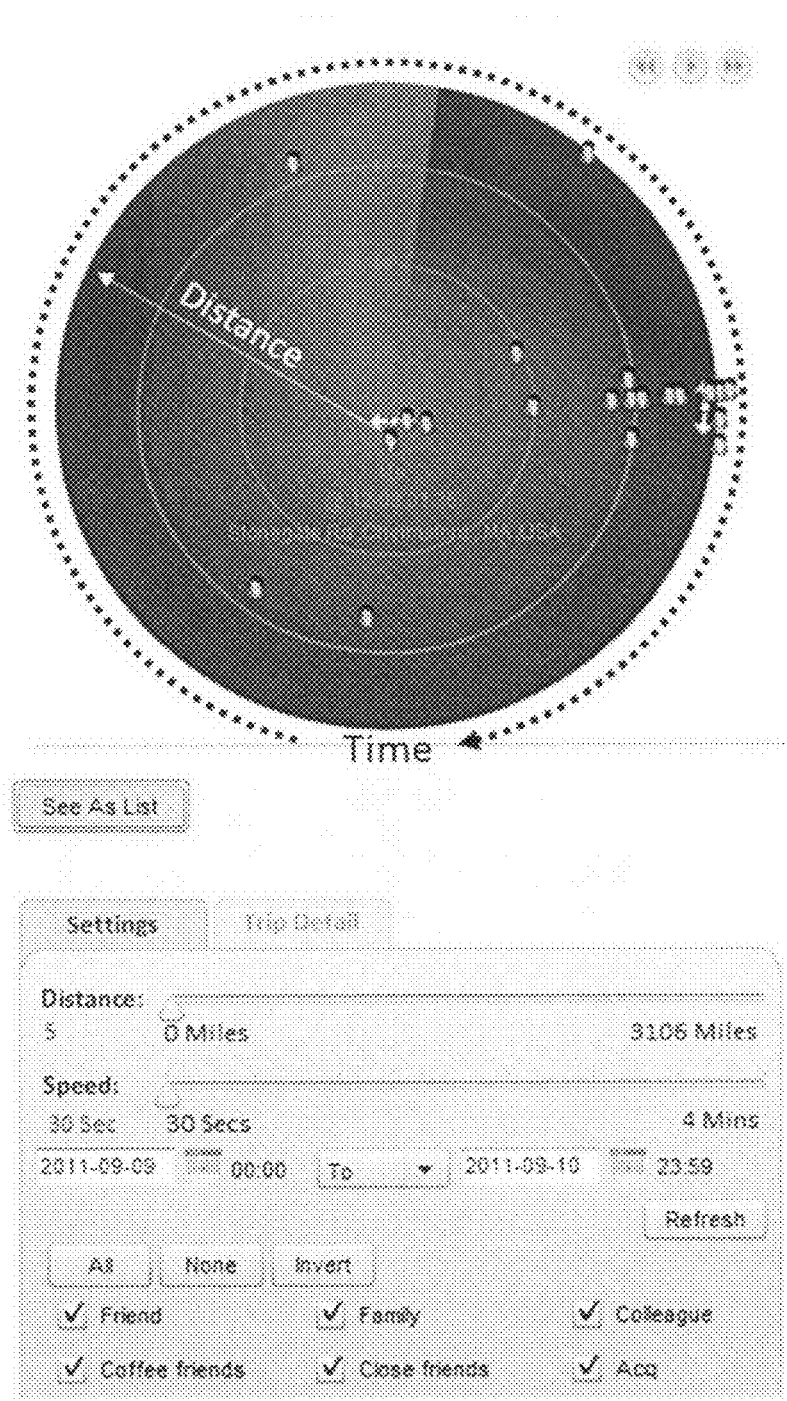
FIGURE 15: RADAR INTERFACE ON A REGULAR COMPUTER BROWSER

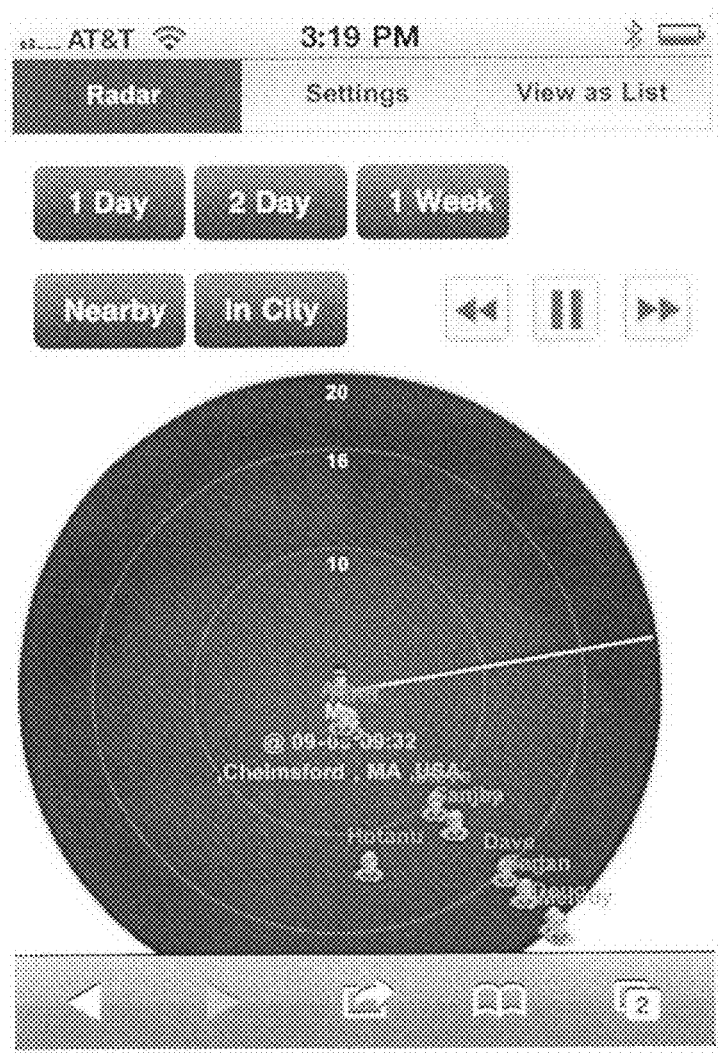
FIGURE 16: RADAR INTERFACE ON A IPHONE SMARTPHONE, USING A BROWSER BASED APPLICATION

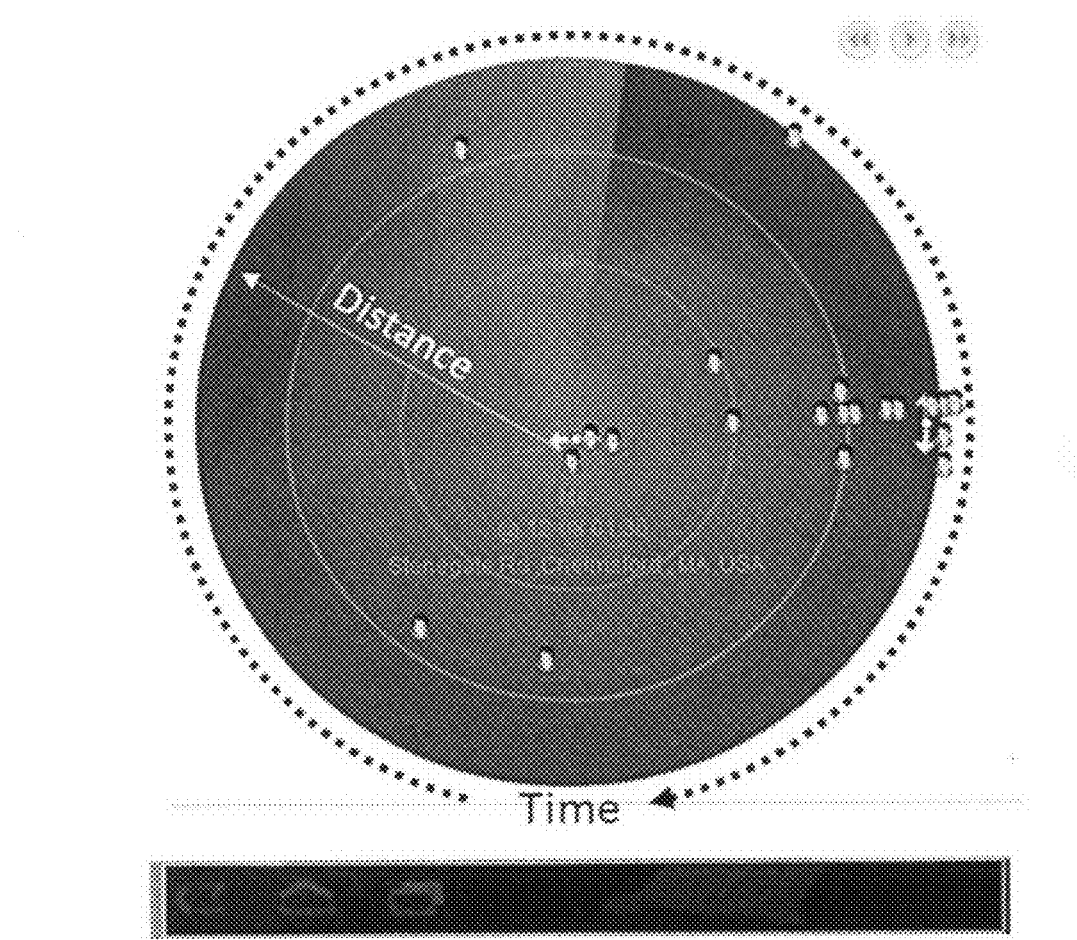
FIGURE 17. RADAR INTERFACE ON A TABLET DEVICE, USING A BROWSER BASED APPLICATION

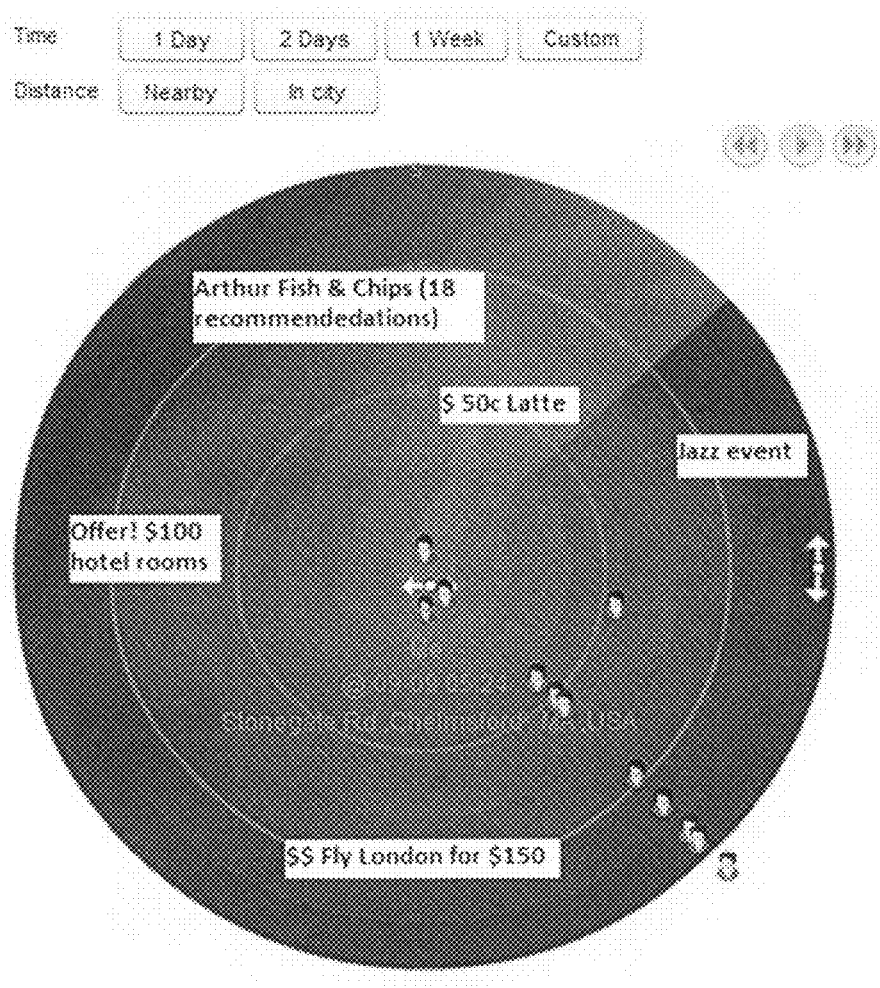
FIGURE 18: RADAR INTERFACE DISPLAYING USER'S FRIENDS AND SPONSORED EVENTS/ADS/DEALS/OFFERS.

GRAPHICAL USER INTERFACE FOR SOCIAL AND PROFESSIONAL NETWORKING AND BUSINESS TRANSACTIONS

CROSS-REFERENCE TO OTHER APPLICATIONS

This application claims priority from the provisional patent application No. 61/381,982, filed by the same inventor on Sep. 11, 2010. The entire contents of the provisional application are incorporated herein by reference. No new matter beyond the disclosure of the provisional application has been introduced.

FIELD OF INVENTION

The present invention is in the field of computerized social, business and professional networking.

BACKGROUND ART

The rapid growth of social networking sites on the Internet attests to the need for individuals to maintain their business and personal relationships and connections. In spite of the inroads made by modern telecommunications the value of face-to-face meetings remains intact, though time pressures for busy lives and geographical distances in can make it harder to meet in person.

In this environment, maintaining "social" connections ends up taking back seat to required mobility for business, in spite of the benefits that social meetings confer in terms of personal well being. But, what if technology could overcome and turn the shortage of time and length of distances into an opportunity for meaningful meetings?

Consider the example which is oft-repeated in some form: a traveler from New England returns from a trip to Orlando, Fla., for a conference—only to find too late that so did his friend who normally lives in California. Or, a new mother who is traveling less frequently now finds that a business acquaintance, who normally works in San Diego, was in Boston for a day.

The parties in these examples could easily synchronize and meet up if they could publish to their "circle of friends," ahead of time, where they expect to be traveling. The present invention makes possible just such publication of future meeting opportunities, securely to one's trusted family, friends and associates. Among the key features of this invention is a radar-like interface which captures the time and geographical data in an easily understood and interpreted graphical format.

At the present time, a few web-based services are available with their own interfaces and protocols, which allow a user to share personal location information with others based on that user's instructions. Examples include dopplr.com, Gowalla.com, loopt.com, buddy alert, friendfinder, hello, Foursquare.com, Plancast.com, Facebook Places, as well as Yahoo's "Fire Eagle" project.

These services differ in important ways from the present invention. Most of these products or services, for instance, are concerned with where the user is "now," as opposed to information relating to a user's "future" location.

Publishing the location where the user will be in the next few hours, days or weeks to the user's circle of friends and family has utility beyond putting out information about where the user happens to be at the moment of publication. Getting "I am here" messages from a number of your friends is nice to know, but it cannot translate into an opportunity to meet any of them in person unless you are within a commuting distance at the time. Getting a message from a friend where s/he will be in a week may permit the recipient to coordinate a meeting in a place where neither normally resides. For busy travelers that kind of information makes possible an in person meeting without added expense to be in the same space-time zone.

Learning of the future plans from a large number of friends can also be more useful than getting the "I am here" message in real time from them. The extra lead time increases the probability of a meet-up without the relatively unproductive exercise of having to continually sift through the messages in order to determine who may be within the vicinity to meet at a given "present" moment.

Plancast.com does feature a user's "future" location information but that service generates and displays the information in a different way. It does not use the radar-like interface that displays the information in a very useful graphical format that is the subject of the present invention.

SUMMARY OF THE INVENTION

The present invention provides tools for efficient networking and is specially targeted to frequent travelers and others active in social networking. The category of business travelers for whom actively maintaining their contact networks is of prime importance will find the products and services of this invention particularly appealing.

The central idea of the invention is to enable those who travel outside their home geographical area to squeeze in meet ups with their contacts when they expect to be in the vicinity of those contacts during the travels. Users who do not travel much will still find the product and service useful for staying in touch with their contacts that travel frequently.

The invention envisions a system and a service which allows users to declare where they are or will be, and invite their friends to join (hence intrinsically viral). The concept is for the service to be integrated with networking sites such as Facebook, in addition to travel and event planning sites.

The word 'user' herein means the user of the computerized system implementing any embodiment of the present invention, who may interact with the system. Through providing information about their products or services, entities such as businesses, service providers, retailers, affinity groups etc can also be deemed to be users of the system. In some cases, the offers and promotions by an entity may appear on the interface in lieu of 'user' while the entity itself may not.

The word 'friend' herein includes the social or professional contacts of the user, either directly, or via groups the user may have joined. It also includes entities such as businesses, service providers, retailers, affinity groups etc. In some cases, the offers and promotions by an entity may appear on the interface in lieu of 'friend' while the entity itself may not.

The following list summarizes the key features of the invention:

Features

Some key features are as follows:
1. Simple sign up: specify your home and work/school locations, invite your friends from various social networks.
2. Declare where you are/will be via web, email, instant messaging or SMS etc, for any period of time
3. Get alerted when your friends are/will be in the same vicinity as you. Highly customizable. Alerts are for all friends, local or not. Examples
   a. Know when friends are in your office/home area or within a certain distance from you.
   b. Find your friends in a city that you are traveling to c. Distinguish alerts based on how far friends have traveled—because you may be willing to drive 100 miles to meet an international friend, but not an in state one.
4. Cool feature: a radar like interface.
5. Allow standard Internet Messaging (IM) privacy settings. User will have full control over information that is shared.
6. Create groups of friends who share the same alerts for flash parties (similar to "flash mobs"), or share similar or complementary interests.
7. Serves as a continually updated contact/address book and a global calendar.
8. Integration with user's existing calendars and PDAs, and with popular events, calendar and social networking sites is envisioned.

BRIEF DESCRIPTION OF THE DRAWINGS

FIG. 1 shows the radar interface is for displaying locations of the friends of the user when they are in the vicinity of his current or future location, or if they are 'online' on instant messaging systems such as yahoo and msn messenger. The radar like interface is explained in the detailed description below.

FIG. 2 shows another view of the radar interface where the locations of the friends in the vicinity are superimposed on a map to give a sense of the friends physical location, not only the distance from the user. This also helps the user determine which of the friends are co-located with other friends.

FIG. 3 is a simplified version of the logical flow of the overall system.

FIG. 4 details the process shown in FIG. 3 box 1100, about how the user's rules are applied.

FIG. 5 details the process shown in FIG. 3 box 1500, about how the user gets alerted based on the data computed using the alerting rules.

FIG. 6 details the logic flow for fetching and displaying the data on the radar or other views in the system. This is a detailed view of box 1700 in FIG. 3.

FIG. 7 details the logic used for computing the dataset to display on the radar based on a user, their connections for the specified groups, the connections trips/activities/virtual events or their special locations (home and work), filtered based on the custom rules and preferences of the user. Included in this logic is the application of the friends' privacy controls too.

FIG. 8 shows an example of the possible asymmetric nature of the groups relationship which the system allows for.

FIG. 9 is an actual screen shot from an implementation of the system, showing the radar interface with its associated Settings panel (tabs) on the right. Other tabs include the Trip Details and Contact tab.

FIG. 10 is a screen shot of the Alerts Setup which enables the user to specify their preferences for the alerts they care about relative to their friends, locations and distance travelled by the friend to arrive at a location etc FIG. 11 shows the screen on which the user can enter their trip. It allows the user to enter just a time based trip without a physical location (such as being 'online') or both a time and place event. The user also specifies which groups of connections they want to share the event with, or keep it invisible if they want to.

FIG. 12 shows a screen to manage the groups of connections for the user. This is a privacy control enabling the user to share their trips selectively.

FIG. 13 shows the screen to enter the user's work and home locations which are special trips. The user also has privacy control over whether this data is shared with other users or not FIG. 14 is a screen shot of the interface where the user can manage their own trips, including adding and importing trips from other interfaces (such as event websites and external calendars).

FIGS. 15, 16 and 17 are actual screen shots from one current implementation of the system.

FIG. 18 is an actual screen shot from one current implementation of the system showing sponsored events, offers and deals from third parties, as displayed.

DETAILED DESCRIPTION OF THE INVENTION

The present invention provides tools for efficient networking and is specially targeted to frequent travelers and others active in social networking. The category of business travelers for whom actively maintaining their contact networks is of prime importance will find the products and services of this invention particularly appealing.

The central idea of the invention is to enable those who travel outside their home geographical area to squeeze in meet ups with their contacts when they expect to be in the vicinity of those contacts during the travels. Users who do not travel much will still find the product and service useful for staying in touch with their contacts that travel frequently.

The central feature of the system is a radar like graphical user interface and a flexible, private and customizable process under user control. This display can be applied to various computerized devices including smart phones, PDAs, tablet computers, and web based devices.

The invention envisions representation of time-driven, event-driven and localization information of interest to the users, as amplified below. Time can be indirectly specified for event-driven information by the occurrence of an event of interest to the users.

1. The Radar Like Interface
   1.1. Consists of a radar like display where the radial line dynamically represents time and the radius represents distance of the friend.
   1.2. Displays the location of friends in space (distance) and time (any point of time in the past present or future).
   1.3. A given point on the radar shows a location at specific time, as determined by the radars parameters. Example, radar shows 2 days with a radius of 100 miles.
   1.4. Display can include physical and non-physical (virtual, online) locations of friends.
   1.5. Display can include sponsored events, deals and offers by third parties and other information that may be of interest to the user.
   1.6. The referential user is at the center of the radar, although it is possible to use other display formats or hide the user.
   1.7. The user, can interact with this information in several ways, such as contacting the friend, or making a transactional communication, such as buying a ticket to the sponsored event or airline flight.
   1.8. The interface includes several navigational controls for the user.
   1.9. A map can be superimposed on the radar to display the geophysical locations of the relevant information.
   1.10. The user can choose various settings for the display. These include groups of people, groups of offers or Ads they may want to see, or from which retailers, or for what interests etc. The user can also specify constraints for location, such as choosing to display only events related to business trips of the user or vacation activities etc.

1.11. The system carries out all operations in accordance with the user's privacy settings, in addition to the user defined rules and system configuration.

1.12. The interface is envisioned to be used on various devices and platforms, such as text based phones and smart phones, tablet computers, laptops and desktops, mobile devices, cloud based services, intranets or extranets etc.

2. Distance Display 2.1. The radius represents distance of the friend's location from the location of the user at that time 2.2. Two or more friends at a similar distance, and located close to each other too, can be displayed in such a way to indicate this fact. Example, the friends can be displayed with green border, bold etc. conversely if they are far apart, they can have a red border.

2.3. The radial display can range from zero to certain miles, or be displayed in relevant bands such as 15-25 and 35-55 miles etc, as determined by the system, or configured by the user.

2.4. If the system detects a high density of activity in a certain time span or location, it could adjust the full circle duration to that time span, and the radial distance to a band around that locations' distance. For example, if high activity is detected at a distance of 20 miles, the radar can adjust to display a radius of 15 to 25 miles.

3. Time Display 3.1. The entire 360 degrees of the radar displays a time span that the user chooses. Example, it could show 1 day, 1 week, 5 days or even few hours to years. The radar line moves in equal increments, example 1 deg each second. The line could also skip and jump to only those time points that have a friend, thus sweeping around faster.

3.2. The time denoted by the angular deviation of the line is calculated based on the overall time span of one full sweep of the radar and 360 degree.

3.3. As the radial line moves, the center of the radar shows the then current location of the user (which may or may not change).

3.4. The system can handle multiple time zones, and is internationalized (I18n), can be localized too (l10n). The time zone may be translated to the user's then current time zone.

3.5. It is possible to display smaller angular segments of information, or show different sets of information on different arcs of the display. For example, the first quadrant could display offers and sponsored events for a time span, the second quadrant could display friends on a social network, and the third could display colleagues on a professional network while the last quadrant could display a specific type of event such as all jazz events.

3.6. The movement of the radial line can be controlled by the user. The line can be paused, forwarded, rewound, dragged around etc.

3.7. The system can be instructed to intelligently adjust the settings of the radar in some cases, such as displaying durations of significance and controlling the correspondence between the angular sweep and the time elapsed. For example, the radar may only display the 2 hours of the whole day set by the user, in which any activity is detected.

4. User's Trips & Locations 4.1. User can input their trips into the system. Some of these may be recurring trips. These trips show up as alerts for the user's friends based on their configurations.

4.2. The user can be in one physical location during any point of time, but multiple virtual locations. Based on requirements later, this can be changed. The user can enter time based activities also, which may or may not be tied to a physical location.

4.3. User has two special recurring locations—home and workplace (could be school, church or any such daytime location). These help in determining special alerts such as 'show me friends who live/work near where I work/live' or 'alert me when friends are near my school'. The user can have more special locations.

5. Security and Visibility 5.1. The user can specify who can see their trips—friends, family, colleagues, all etc. The visibility level for these could be nested or overlapping.

5.2. The user can create a trip that is invisible to anyone. This lets them see which friends are in the location, but not alert the friends yet, because the trip may be tentative or private.

5.3. The user can control what data about the trip they share with friends. They can hide address detail and contact numbers and other personal details as they wish.

6. Gestures or Input Device Motion and Clicking 6.1. On touch screens: With 2 or more fingers, squeezing the radar zooms out the distance (say 50 to 200 miles), spreading it zooms in (250 to 100 miles). The minimum and maximum distances are configurable. The same effect can be had by a mouse scroll wheel, or other input devices and motions. A single finger radial motion can also do the same, inward or outward.

6.2. On touch screens: Rotating it clockwise with two or more fingers (as if the radar was a knob), or running a finger in an arc motion, zooms in the time (say 10 days to 1 day) and counter-clockwise zooms out the time (say 2 days to 20 days). The min and max times are configurable. The same effect can be had by dragging the mouse instead if the finger, on a webpage.

6.3. The invention envisions other input devices not currently in use.

6.4. In the currently implemented version, a horizontal arrow in the center of the radar allows the user to zoom in and out by sliding the arrow left or right in a radial motion. The user can also zoom in and out the time by sliding a vertical arrow on the edge in a clockwise or counter clockwise manner. Various alternatives of this input motion are conceived to be implemented.

7. Convenience Features 7.1. Mouseover, right click or other such inputs on various sections of the radar or alerts or other relevant areas provides convenience features for the user.

7.2. Action on the popup friend icon can include, ways to contact the friend, look up location details, find a café nearby, add a trip for the user at that location, or arrange to have a group meeting etc.

7.3. Find common friends that are near the location, setup group meetups etc.

8. Alerts 8.1. When a friend is in the vicinity of the user (and the radar has space-time parameters set to include the friends location), the friend icon pops up on the radar when the date-time shown by the line.

8.2. The icon can be configured in look and theme.

8.3. Because the friend may be at the location for a period of time, once the initial icon popup occurs, the time period for that friend will be displayed as the line moves along, until the friend isn't at that location. This display can be done in many ways, example show a trailing line (arc) starting from the initial popup, the arc being drawn as the radial line sweeps, till the ending time for the friend. The display can be optimized when many friends show up in similar locations so as to unclutter the display. Example, showing an icon group and then move details on mouseover or such.

9. Alert Vicinity Rules
    9.1. The user can be alerted based not only on how near a friend is, but also how far the friend has travelled to be in that location and other such relative movement parameters. Example, the user may want to know if an out of state friend is in state (but may not want to be alerted if an instate friend is more than 20 miles away), an out of country one is in country or in state etc.
    9.2. These rules can be configured to a high degree of complexity and customized to suit the user's preferences.
    9.3. The user may not want to be alerted during certain periods of time (quiet mode), example when in town friends are within 5 miles but the user is at their workplace.
    9.4. Alerts apply to virtual status of friends too. The user may want to know only friends on a certain instant messaging system, or website such as Facebook etc, or to be alerted only within a particular time frame. Example, the user doesn't want alerts if friends in a 12 hour away time zone are online while the user is sleeping.
    9.5. The distance can be configured at the level of each friend or groups. So 'close friends' group may trigger alerts when 10 miles or less, while 'casual friends' may have a limit of 5 miles.
    9.6. The friend may popup on the radar a bit earlier than the friend's trip time which would give the user some time to reach the destination. This could be a user preference.
10. Alternate Views of the Radar Data
    10.1. In some cases the user may wish to see the custom radar data in a simple list view or superimposed on a calendar. The user can switch to these views on the application.
    10.2. The user may wish to see all friends popup at the same time relative to their location on the radar, or may want to fade the friends in and out etc. The application allows for different views to support these custom preferences.

The operation of some key components of the system is illustrated by the flow diagrams of FIGS. 3-8.

Figure 11:
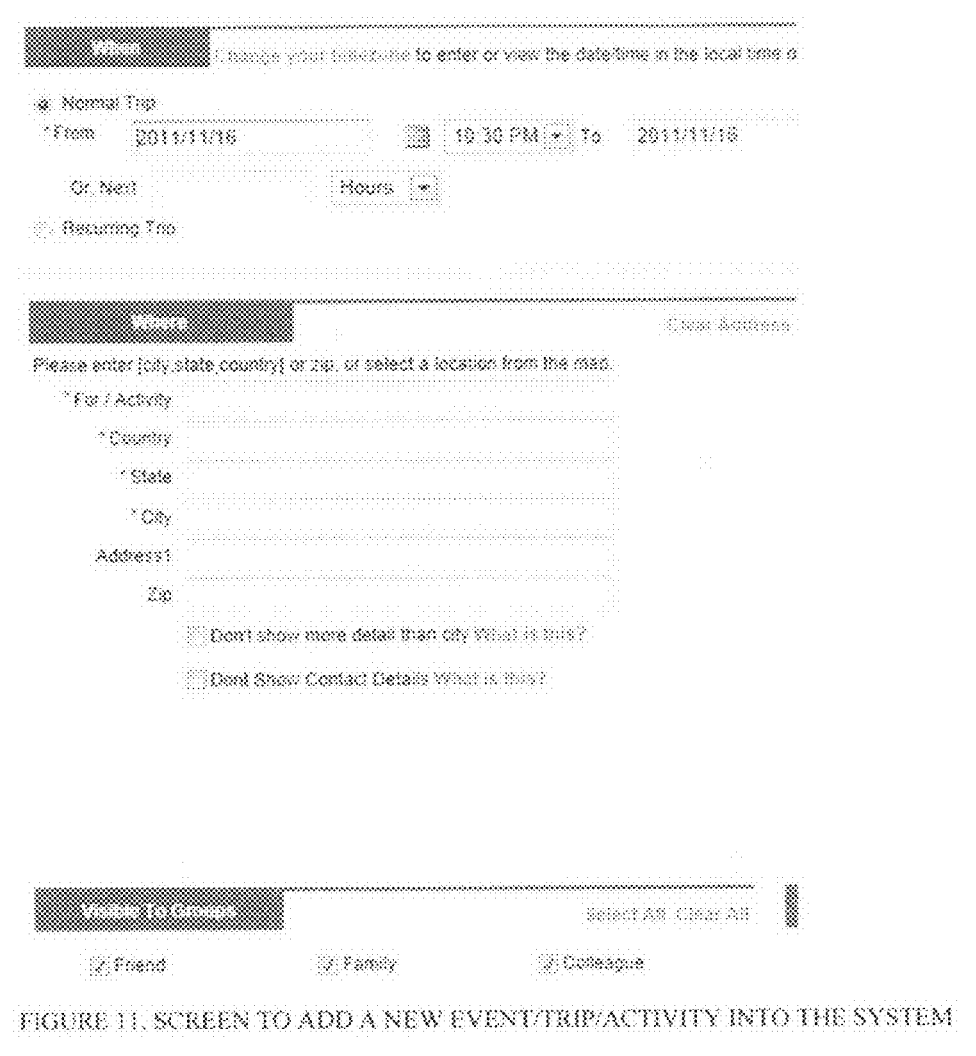

The FIGS. 9 through 14 illustrate the screen shots of the various input and output interfaces and mechanism of the system.

DETAILED DESCRIPTION OF THE DRAWING FIGURES

FIG. 1 shows the radar interface is for displaying locations of the friends of the user when they are in the vicinity of his current or future location, or if they are 'online' on instant messaging systems such as yahoo and msn messenger. The radar like interface is explained in the detailed description above. The icons represent friends of the user. The referential user is displayed in the center for convenience. It is possible not to display the referential user on the radar, or to draw the radar with reference to another user. The labels indicate various features of the radar, such as the distance between the user and their friends, the time span over which the information is displayed. Virtual locations (such as the online status of the friends on various instant messaging systems) is also displayed on the radar. Other displayed information on the radar includes sponsored events, deals and offers from other parties that may be of interest to the user.

Clicking on the people icons or the offers/deals icons provides additional information about that person or event or offer etc. The user can interact with this information in several ways, such as contacting the friend, or making a transactional communication, such as buying a ticket to the sponsored event or airline flight.

The interface includes several navigational controls, such as the displayed stop, play and rewind icons.

FIG. 2 shows another view of the radar interface where the locations of the friends in the vicinity are superimposed on a map to give a sense of the friends physical location, not only the distance from the user. This also helps the user determine which of the friends are co-located with other friends. The map can display additional geophysical information related to the locations of the friends, events or offers that are displayed on the radar.

FIG. 3 is a simplified version of the logical flow of one implementation of the overall system. Users signup and provide some details about their home and work locations, and setup their custom preferences for how they want to be alerted on the radar. Then they may add trips. When a user looks at the radar, or when the system detects that 2 or more users are in the vicinity of each other, it alerts them based on their notification settings and on the radar view and other views.

Login and profile information is collected in the initial boxes 100 to 300 of the diagram.

Box 310 allows the user to invite their professional and social network friends to connect with then on this system. Such connections help determine the set of people with whom information is shared, and is used for implementing the privacy and selectivity options in the system. Other ways to connect with people is by joining groups, provided by the system, in which case explicit user level connections are not needed for radar information.

Box 400 allows the user to setup the rules which determine the configuration of their personal alerts and notifications preferences.

Box 1000 allows the user to tell the system of a past, present or future intended location or activity.

This is an important distinction of the present invention from the currently available products, which allow only the current location to be communicated to the system since they are based on GPS based location data of the user and others. By allowing the user or any related party of the system, the ability to communicate and publish their future locations and intended activities, the system allows for pre-planning of meetings and interactions between people with other people or businesses.

Box 2000 and 3000 depict other personal users or business users or third party systems adding more data to the system. The data includes trips, activities, events, offers, deals etc which may be included in the data that the system processes in box 1100.

Boxes 1100, 1500 and 1700 are elaborated below.

Box 1600 displays all the information which may or may not be displayed on the radar, such as all the trips made by the user's friends, whether or not they are near the user, or all deals posted by another party, whether or not they are relevant to the user.

FIG. 4 details the process shown in FIG. 3 box 1100, about how the user's rules are applied.

FIG. 5 details the process shown in FIG. 3 box 1500, about how the user gets alerted based on the data computed using the alerting rules.

FIG. 6 details the logic flow for fetching and displaying the data on the radar or other views in the system. This is a detailed view of box 1700 in FIG. 3.

Box 1720 described the process to allow the user to specify the settings for which they want the radar data to be displayed. This may include the groups of friends they want to get alerted for, the settings for the radar time and distance etc. In addition, in another embodiment of this interface, the user can specify which groups of offers or Ads they may want to see, or from which retailers, or for what interests etc. The user can also specify constraints for location, such as choosing to display only events related to business trips of the user or vacation activities etc.

Box 1740 computes the alerts dynamically or may retrieve them from a periodically updated cache of data. The processes of this box and box 1750 are further elaborated in FIG. 7.

Box 1760 describes the process to display the alerting information on the radar based on the settings selected in box 1720, in conjunction with system and user preferences and configurations. Events and trips have both a location and time component to them, whereas activities may only have a time component, such as being 'online' on one of the various instant messaging systems. Such time-only activities are referred to as 'virtual trips'. The words activities, trips, events are used interchangeably.

The user's friends matching their alert criteria is displayed. The friend appears on the radar when the time displayed on the radar, typically by the sweeping line, matches the start of the friend's trip or activity, or the start of a sponsored event, or any similar time oriented activity. The friend's name and picture and other information may be displayed. The user may get an audio or video alert based on their preferences. For the duration of the event, a tail may be displayed from the starting point, indicating the duration of the event, or the duration may be displayed when the user has some interaction with the particular icon or display. Friends that are co located to each other could be color coded, to indicate the geographical proximity, or not, of the user's network, in addition to the displayed distance proximity. For virtual activities, the information may be displayed on the periphery of the radar, denoting the time status of the activity.

Sponsored events, activities, offers deals etc are similarly displayed on the radar. One embodiment of this is shown in FIG. 18. The user can interact with these displays for additional information or for transaction communication etc.

Box 1800 described the process of refreshing the display and various optimizations that may be performed. If nothing has changed relative to the user in the system, such as friends' locations or events or deals or activities or interests etc, the system may not re-compute the data. For performance reasons, it is possible that the system may re-compute the data only after certain intervals or based on certain triggering events or batches. It could display cached information in between these triggers or intervals. The user could also configure these at the user level, to improve their experience with the system.

The radar can be left in an active state for long periods of time, such as on wall displays, where it can alert users to any of the configured information, such as people, events, deals, etc. The radar would continually refresh based on new data in the system and display the new information.

The system can be instructed to intelligently adjust the settings of the radar in some cases, such as displaying durations of significance and controlling the correspondence between the angular sweep and the time elapsed. For example, the radar may only display the 2 hours of the whole day set by the user, in which any activity is detected. Furthermore, if the system detects a high density of activity in a certain time span or location, it could adjust the full circle duration to that time span, and the radial distance to a band around that locations' distance. For example, if high activity is detected at a distance of 20 miles, the radar can adjust to display a radius of 15 to 25 miles.

FIG. 7 details the logic used for computing the dataset to display on the radar based on a user, their connections for the specified groups, the connections trips/activities/virtual events or their special locations (home and work), filtered based on the custom rules and preferences of the user. Included in this logic is the application of the friends' privacy controls too.

This figure is an illustration of the logic to fetch radar data. Based on the radar settings given by the user, all their connections are fetched and filters the connections based on the rules setup for the groups of connections. Then a calendar is prepared for each connection for the time duration of interest, including recurring trips spanning or falling within that time duration as well as virtual trips in that time span.

For the times that the user or their connections do not have any activities, it is assumed they are at some default locations, such as work or home locations, which can be configured.

Additional rules relating to the user's alerting preferences are then applied to this data, and the system computes the distance of the friends from the user's locations.

User's and friends privacy settings and system security settings are also applied to this data.

FIG. 8 shows an example of the possible asymmetric nature of the groups relationship which the system allows for. It illustrates the nuances of the relationship between people.

The visibility of the information shared between the people is determined by both the sender's and the recipient's settings. The system honors the privacy and security settings by the users, to the point that if A shares a trip with a 'Colleague' B, B may not see the trip if B has specified that A is a 'Friend' and chooses to see only 'Friend's trips.

FIG. 9 is an actual screen shot from the system, showing the radar interface with its associated Settings panel (tabs) on the right. Settings allow the user to control the distance and duration for which they want to localize friends, along with UI features like controlling the speed of the sweep etc. Other tabs include the Trip Details (which shows the details of the friend's trip), Contact tab (which allows the user to contact a particular friend or groups of friends via email, phone or SMS etc.

A more elaborate version of the figure is shows in FIG. 15.

FIG. 10 is a screen shot of the Alerts Setup which enables the user to specify their preferences for the alerts they care about relative to their friends, locations and distance travelled by the friend to arrive at a location etc FIG. 11 shows the screen that the user can enter their trip on. It allows the user to enter just a time based trip without a physical location (such as being 'online') or both a time and place event. The user also specifies which groups of connections they want to share the event with, or keep it invisible if they want to.

FIG. 12 shows a screen to manage the groups of connections for the user. This is a privacy control enabling the user to share their trips selectively.

Figure 13:
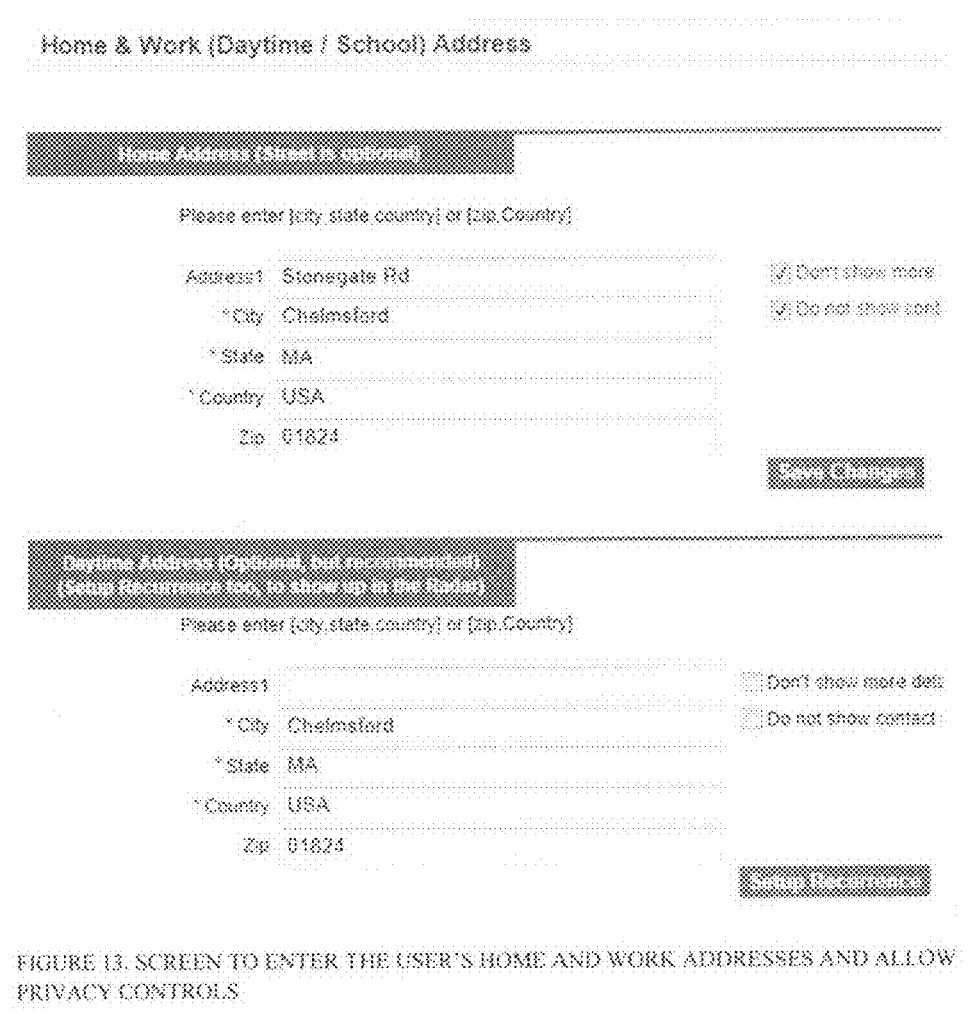

FIG. 13 shows the screen to enter the user's work and home locations which are special trips. The user also has privacy control over whether this data is shared with other users or not FIG. 14 is a screen shot of the interface where the user can manage their own trips, including adding and importing trips from other interfaces (such as event websites and external calendars).

FIG. 15 shows the radar interface with its associated "Settings panel" (tabs) on the right. Settings panel allows the user to control the distance and duration within which they want to localize friends, along with user interface features, such as, controlling the speed of the radar sweep. Other tabs in this implementation include "Trip Details" (which may show details of the friend's trip), "Contact tab" (to allow the user to contact a particular friend or groups of friends via email, phone or SMS etc.).

The user can select the groups of people that they want to display, by checking the various boxes on the Settings panel. Options are also provided for quick access to pre-defined settings of time and distance. These are assumed to be the most frequently used settings, and can be changed at the system level, or configured by the user. The information can alternatively be displayed in a list format, using the 'View as List' option, which is similar to the 'feed' style of other common social networks.

FIG. 16 shows the radar interface implemented on a Smartphone, in a browser based application. This has many similarities with the non-phone browser interface, with the addition of the ability to use the touch interface.

This implementation combines features of a native phone application (i.e., non browser based) with a user interface to the one described for FIG. 15. Examples are the additional features and touch gestures available for native applications only, such as being able to look up the phone address book for people details when the user selects a person on the radar, having the option, for example, to show 'friends from my phone address book' dynamically etc.

Various gestures described in the application are implemented here, using the available technology on desktop/laptop interfaces (non-touch) or tablets (touch interface) and phones or similar mobile devices, including non smartphones (non graphic text display). The gestures can be carried out via a mouse, as shown in FIG. 15, or via the hand, as shown on the Smartphone interface in FIG. 16.

FIG. 17 shows the radar interface on a tablet computer. It is clear from FIGS. 15, 16 and 17 that the basic interface is similar across the various platforms. FIG. 17, in particular, shows the process of the system 'discovering nearby friends' based on the various settings selected by the user. Depending on the available platform, this process may be performed interactively with the user, or in the background independently of the user's interactions, so that the user can be alerted when a particular friend is nearby or meets their alert criteria. For example, on a location based device, the user can be alerted when someone or something of interest is nearby, or going to be nearby in the future, based on continual computing in the background on the user's device, possibly in conjunction with updated information from the backend system.

Various other configurations and embodiments of the interface are possible, based on the capabilities of the underlying device, the architecture of the platform. For example, on text based non-smart phones, a text based 'radar' can be displayed with simple text based graphics to show the information and allowing the user to issue text based commands to interact with the 'text radar'.

FIG. 18: This shows another embodiment of the radar interface, expanding on mockup drawings of FIGS. 1 and 2. FIG. 18 elaborates the display of sponsored events, offers and social recommendations etc, on the radar interface itself. This example displays hotel, airline and cafe offers from retailers, and sponsored events from other parties that maybe of interest to the user, based on the intended plans and activities of the user. The system may be provided, or may obtain the additional information from various online and offline sources, social networks, businesses etc, or from other parties or systems. The user can click on these offer displays and interact with them to get more information.

Having described the invention, I claim:

1. A method of receiving and displaying by a computerized communication system the information published by one user of the system to a set of users of the system specified by said one user, wherein the information comprises time-driven, event-driven or localization information, and the method comprises the steps of:
   (a) computing time, event and localization information relating to one or more of said set of other users in accordance with system rules and criteria;
   (b) compiling differences in the computed localization, event and time information based on a set of criteria specified by said one user and one or more of said set of users;
   (c) reconciling time, event and localization information by resolving differences according to a set of priorities specified by said one user and one or more of said set of users;
   (d) compiling a set of recipients of information as a subset of said set of users based on criteria specified by said one user and one or more of said set of users, wherein said criteria include specification by said one user of the level of details of localization, event and time information shareable with one or more of said set of users and specification by one or more of said set of users of the level of details of localization, event and time information shareable with said one user, where said details depend on the privacy and alert settings by said user or by one or more of said set of users; and
   (e) recording of time, event and localization information for said subset of the set of users;
   (f) providing a graphical user interface displayed as a circular disc with said one user represented at the center of the disc by using the localization information of said one user;
   (g) graphically representing and displaying another user, other than said one user, on said circular disc by a point, wherein the radial distance of the point from the center denotes a metric between the localization information of said one user and the localization information of said another user, wherein the metric is the distance between the physical location of two users, or a measure of time which corresponds to a traversal of the distance between the physical locations of two users, or a pre-specified proportion of the disc when localization information is not in reference to a physical location;
   (h) displaying a graphical representation of the passage of a time duration on said circular disc by an angular deviation of a radial line from an initial position, where the representational correspondence between time and angle is specified by said one user or determined by the system based on criteria specified by said one user; and
   (i) providing a visual display of the passage of time duration with reference to said one user on said circular disc by the movement of said radial line, and
wherein, localization information is specified by one or more of the users or generated by the system, and includes time information, spatial or online location information, online presence information, and information about a predefined activity in which one or more users participate.

2. The method of claim 1 wherein said one user is a group of users.

3. The method of claim 1 wherein said publishing or receiving is carried out over a communication network.

4. The method of claim 3 wherein said communication network is the Internet.

5. The method of claim 1 wherein the rate of the movement of the radial line is specified by said one user or computed by the system based on criteria specified by said one user.

6. The method of claim 2, wherein said group of users is an entity and said predefined activity is a promotion or an offer by said entity.

7. A computerized system of receiving, publishing, and displaying information for a set of users, comprising time-driven, event-driven or localization information, wherein the system comprises the following elements:
   (a) A part that publishes information for one or more of said set of users;
   (b) A part that receives information from one or more of said set of users;
   (c) A part that processes information received from one or more of said set of users;
   (d) A part that displays information received from one or more of said set of users;
   wherein the processing and displaying of information comprises the steps of:
      computing time, event and localization information relating to one or more of said set of other users in accordance with system rules and criteria;
      compiling differences in the computed localization, event and time information based on a set of criteria specified by said one user and one or more of said set of users;
      reconciling time, event and localization information by resolving differences according to a set of priorities specified by said one user and one or more of said set of users;
      compiling a set of recipients of information as a subset of said set of users based on criteria specified by said one user and one or more of said set of users, wherein said criteria include specification by said one user of the level of details of localization, event and time information shareable with one or more of said set of users and specification by one or more of said set of users of the level of details of localization, event and time information shareable with said one user, where said details depend on the privacy and alert settings by said user or by one or more of said set of users;
      recording of time, event and localization information for said subset of the set of users;
      providing a graphical user interface displayed as a circular disc with said one user represented at the center of the disc by using the localization information of said one user;
      graphically representing and displaying another user, other than said one user, on said circular disc by a point, wherein the radial distance of the point from the center denotes a metric between the localization information of said one user and the localization information of said another user, wherein the metric is the distance between the physical location of two users, or a measure of time which corresponds to a traversal of the distance between the physical location of two users, or a pre-specified proportion of the radius of the disc when localization information is not in reference to a physical location;
      displaying a graphical representation of the passage of a time duration on said circular disc by an angular deviation of a radial line from an initial position, where the representational correspondence between time and angle is specified by said one user or determined by the system based on criteria specified by said one user; and
      providing a visual display of the passage of time duration with reference to said one user on said circular disc by the movement of said radial line, and
   wherein, localization information is specified by one or more of the users or generated by the system, and includes time information, spatial or online location information, online presence information, and information about a predefined activity in which one or more users participate.

* * * * *